(12) United States Patent
Sidebotham et al.

(10) Patent No.: US 11,821,335 B2
(45) Date of Patent: Nov. 21, 2023

(54) BLADE INTAKE

(71) Applicant: ROLLS-ROYCE plc, London (GB)

(72) Inventors: Gary Sidebotham, Macclesfield (GB); John Harris, Derby (GB); Chenhui Liu, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/880,492

(22) Filed: Aug. 3, 2022

(65) Prior Publication Data
US 2023/0051685 A1    Feb. 16, 2023

(30) Foreign Application Priority Data

Aug. 12, 2021 (GB) .......... 2111579
Feb. 14, 2022 (GB) .......... 2201900

(51) Int. Cl.
*F01D 5/18* (2006.01)
*F01D 5/08* (2006.01)
*F01D 5/30* (2006.01)

(52) U.S. Cl.
CPC ............ *F01D 5/187* (2013.01); *F01D 5/081* (2013.01); *F01D 5/3007* (2013.01); *F05D 2220/323* (2013.01); *F05D 2240/81* (2013.01); *F05D 2260/2212* (2013.01); *F05D 2260/40311* (2013.01); *F05D 2260/941* (2013.01)

(58) Field of Classification Search
CPC .......... F01D 5/081; F01D 5/082; F01D 5/186; F01D 5/187; F01D 5/3007; F01D 5/3015; F05D 2260/20; F05D 2260/202; F05D 2260/941; F05D 2260/40311
See application file for complete search history.

(56) References Cited

U.S. PATENT DOCUMENTS

| 2016/0090850 A1* | 3/2016 | Barry ............ F01D 5/081 416/221 |
| 2016/0090854 A1* | 3/2016 | Webb ............ F01D 5/081 416/220 R |
| 2016/0160648 A1* | 6/2016 | Virkler .......... F01D 5/187 416/1 |

(Continued)

FOREIGN PATENT DOCUMENTS

| EP | 3 085 895 A1 | 10/2016 |
| EP | 3 088 669 A1 | 11/2016 |

(Continued)

OTHER PUBLICATIONS

Oct. 7, 2022 Extended Search Report issued in European Patent Application No. 22188260.8.

*Primary Examiner* — Christopher Verdier
(74) *Attorney, Agent, or Firm* — Oliff PLC

(57) ABSTRACT

A blade for use in a gas turbine engine, the blade comprising a blade portion and a fir tree root portion, the blade portion and the root portion having a connected passage for allowing cooling air to flow within the blade, the fir tree root portion having an air intake on its leading edge, the air intake allowing cooling air to enter the cooling passage and wherein the fir tree root portion comprises a plurality of projections, including at least a base projection and a top projection; and wherein the air inlet located in the base projection of the fir tree root portion and wherein the air inlet comprises at least 50% of the face of the base projection of the fir tree root portion.

10 Claims, 7 Drawing Sheets

(56) References Cited

U.S. PATENT DOCUMENTS

| | | | |
|---|---|---|---|
| 2016/0208620 A1* | 7/2016 | Thistle | F01D 5/187 |
| 2016/0273370 A1* | 9/2016 | Belshaw | F01D 5/3015 |
| 2016/0312620 A1* | 10/2016 | Diamond | F01D 5/18 |
| 2016/0312621 A1* | 10/2016 | Barry | F01D 5/188 |
| 2017/0022817 A1* | 1/2017 | Alpan | F01D 11/006 |
| 2017/0138200 A1* | 5/2017 | Negulescu | F01D 5/081 |
| 2017/0191370 A1* | 7/2017 | Dawson | F01D 11/003 |
| 2017/0198589 A1* | 7/2017 | Burford | F01D 11/003 |
| 2020/0277866 A1 | 9/2020 | Dos Santos et al. | |

FOREIGN PATENT DOCUMENTS

| | | |
|---|---|---|
| EP | 3 121 374 A1 | 1/2017 |
| EP | 3 144 475 A1 | 3/2017 |
| EP | 3 306 036 A1 | 4/2018 |

\* cited by examiner

BLADE INTAKE

OVERVIEW OF THE DISCLOSURE

The present disclosure relates to an air intake in a blade for use in a gas turbine engine. In particular, the invention relates to an air intake into a turbine blade of a gas turbine engine.

BACKGROUND OF THE DISCLOSURE

Turbine blades are part of the turbine system of a gas turbine engine and are used to extract energy from the gas stream. The turbine blades are mounted on discs, to form a bladed disc which rotates in the high temperature airflow exiting the combustor. In order to extract the energy the bladed discs are coupled to shafts whose rotation is used to drive other parts of the turbine engine in particular the compressor and fan sections. The blades are typically mounted to the discs via a fir tree root which is formed as part of the blade; this fir tree root is placed within a corresponding slot on the outer circumference of the disc. The blades are securely held in place on the disc through the use of a lockplate, which engages with both the disc and the blade.

In operation the turbine blades require a supply of cooling air into and through the blade. This cooling air is required to allow the blades to operate at temperatures hotter than the melting point of the material that is used to form the blade. The cooling air is supplied through an air intake at the base of the blade. A duct directs a portion of the cooling air into an internal cooling passage within the blade. The design of the inlet and the duct is a balance between strength and airflow. As such, the design of the air intake can result in issues with stress on the walls of the fir tree, which could potentially result in blade failure. Another issue is to minimise any losses in the system; this is in part because the configuration of the duct and the inlet can result in high pressure losses in the air feed to the blades cooling holes. Thus, there is an objective to maximise airflow whilst maintaining the strength of the turbine blade.

SUMMARY OF THE DISCLOSURE

According to a first aspect there is provided a blade for use in a gas turbine engine, the blade comprising a blade portion and a fir tree root portion, the blade portion and the root portion having a connected passage for allowing cooling air to flow within the blade, the fir tree root portion having an air intake on its leading edge, the air intake allowing cooling air to enter the cooling passage and wherein the fir tree root portion comprises a plurality of projections, including at least a base projection and a top projection; and wherein the air inlet located in the base projection of the fir tree root portion and wherein the air inlet comprises at least 50% of the face of the base projection of the fir tree root portion.

The inlet may comprise between 55% and 75% of the inlet of the base projection of the blade.

The air passage beyond the inlet may be tapered so that at points it is narrower than the inlet.

The air inlet may extend proximate to the antirotation pocket on the blade.

There may be a constant radius between the inlet and the base projection of the fir tree root portion.

The base of the bottom and sides of the inlet may have an offset.

A duct may be provided further into the blade than the inlet.

The duct may have an opening that is equal to approximately 25-60% of the area of the air intake.

The duct may have an opening that is equal to 30-50% of the area of the air intake.

The duct may have a taper starting from a tip the duct, such that it guides air into the internal air passage.

The blade may be a turbine blade.

According to a second aspect there is provided a gas turbine engine for an aircraft comprising: an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft, wherein the turbine section has a bladed disc comprising a plurality of turbine blades according to the any of the aspects presented above.

The turbine may be a first turbine, the compressor is a first compressor, and the core shaft is a first core shaft; the engine core further comprises a second turbine, a second compressor, and a second core shaft connecting the second turbine to the second compressor; and the second turbine, second compressor, and second core shaft are arranged to rotate at a higher rotational speed than the first core shaft.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform. The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400 K, 1450 K, 1500 K, 1550 K, 1600 K or 1650 K. The TET at cruise may be in an inclusive range bounded by any two of the values in the previous sentence (i.e. the values may form upper or lower bounds). The maximum TET in use of the engine may be, for example, at least (or on the order of) any of the following: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds), for example in the range of from 1800 K to 1950 K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent). Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached.

Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE FIGURES

Embodiments will now be described by way of example only, with reference to the Figures, in which.

DETAILED DISCLOSURE

Figure 1:
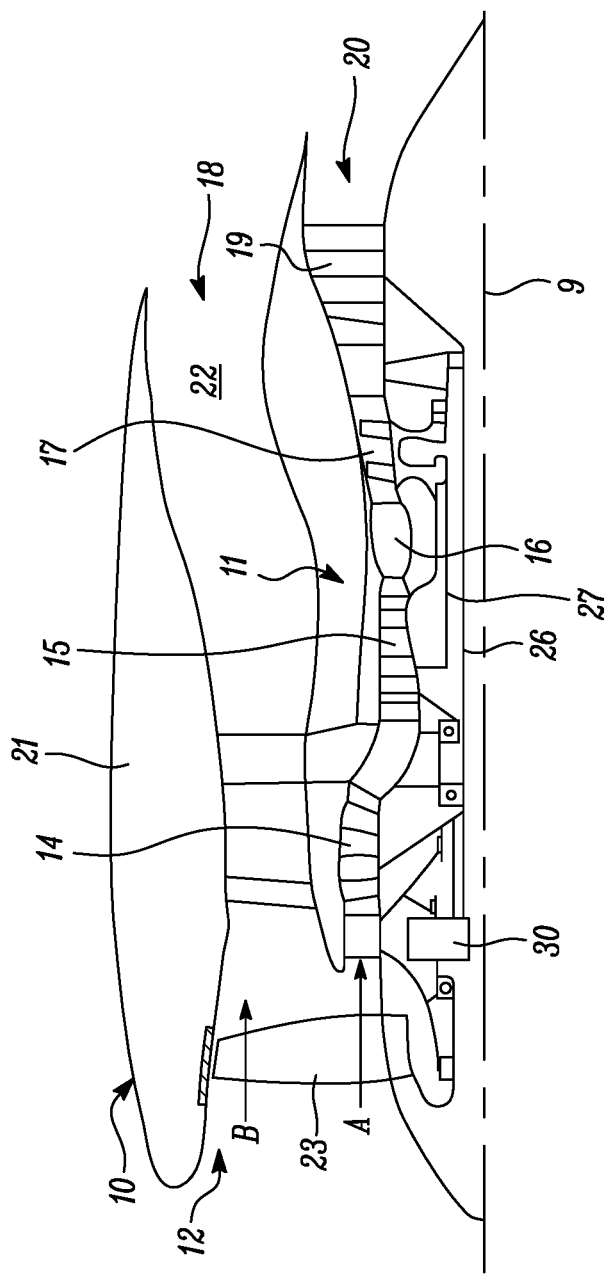
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
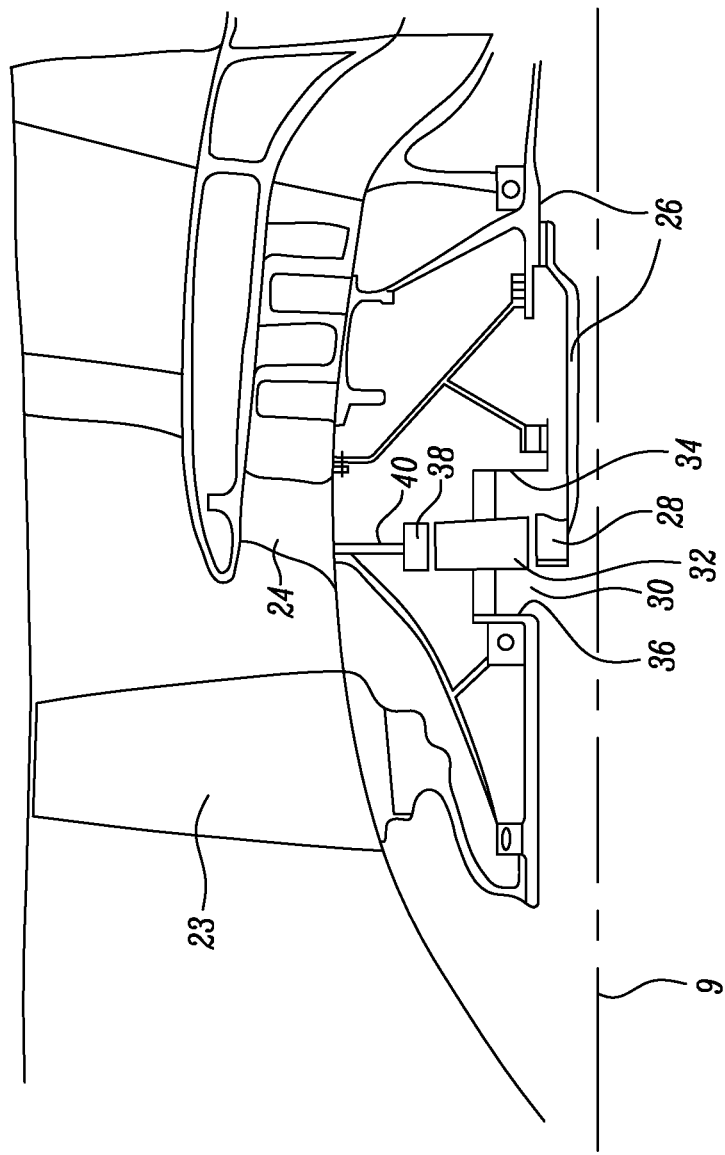
FIG. 2 is a close-up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
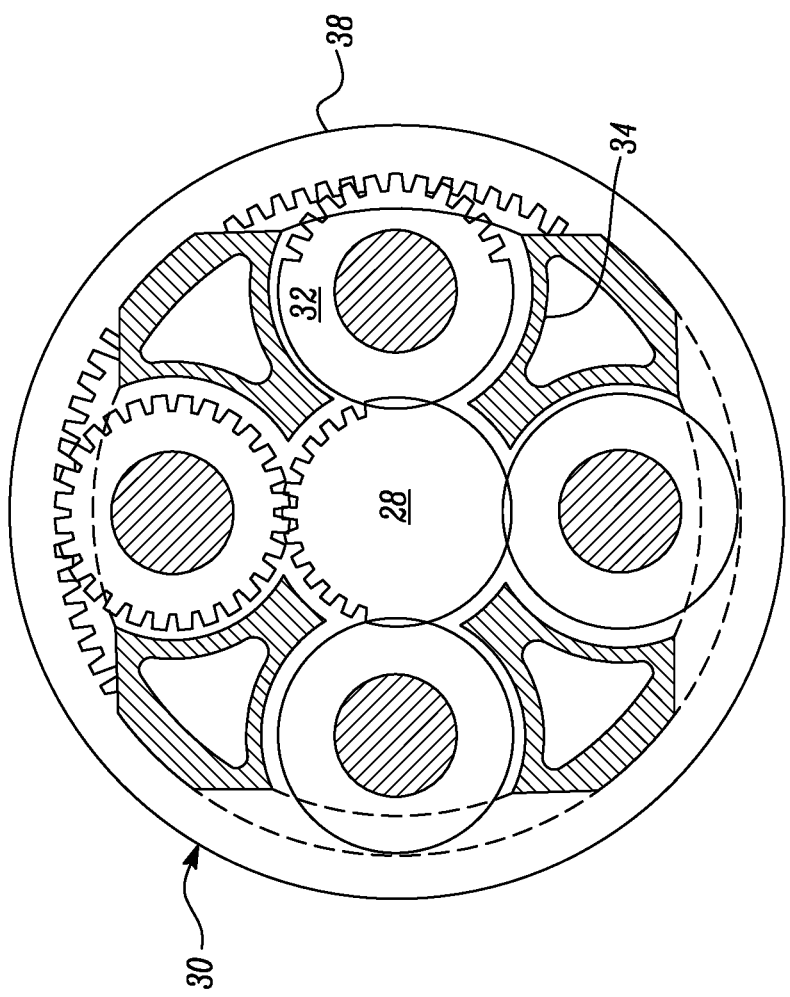
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
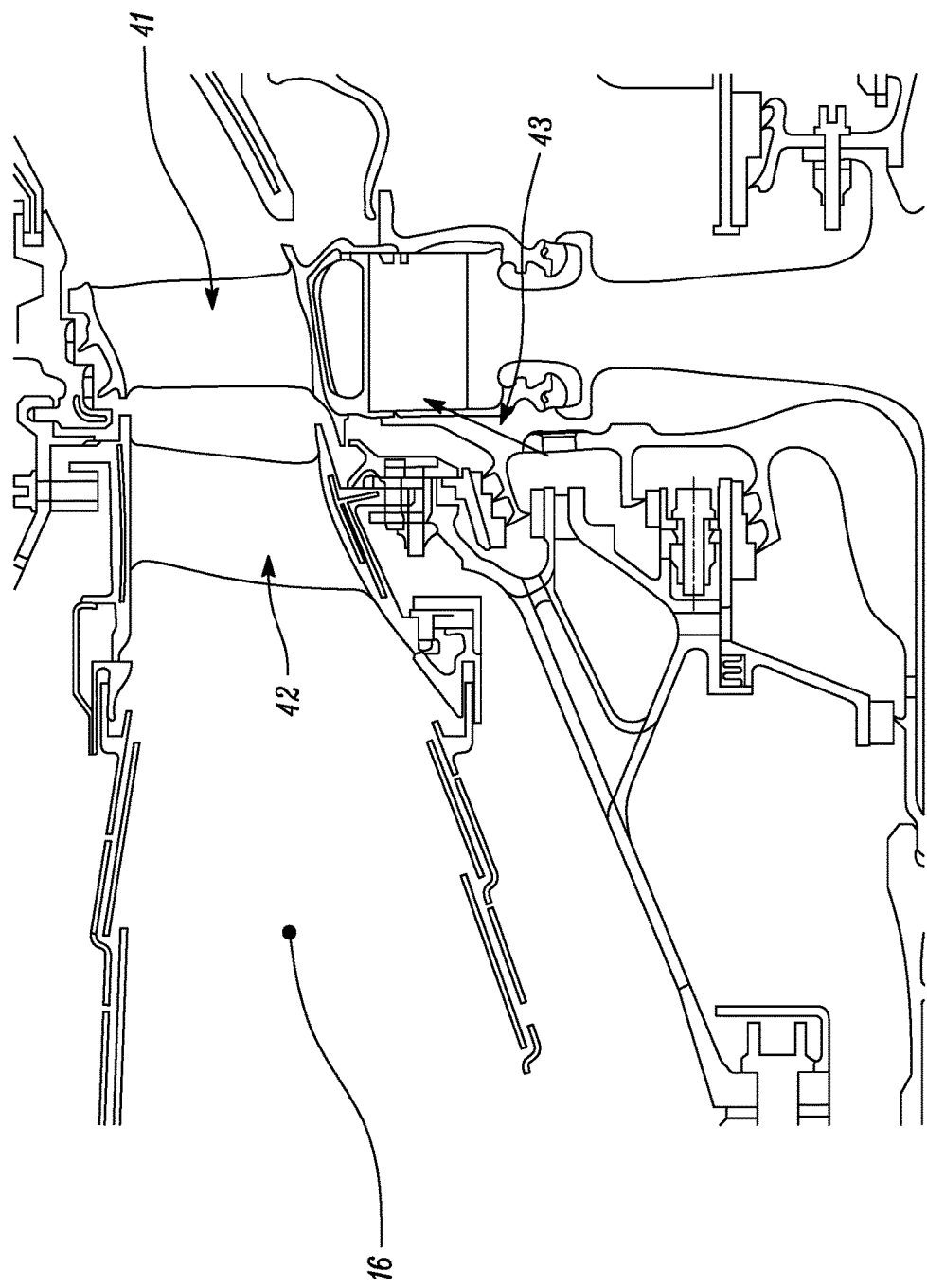
FIG. 4 is a cut away section of the high-pressure turbine region of a prior art gas turbine engine.

The turbine section as shown in FIG. 1 incorporates multiple turbine stages, which in the case of FIG. 1 is three. These comprise at least a high-pressure turbine region, intermediate-pressure turbine region and a low-pressure turbine region. The high-pressure turbines are located closest to the combustor and thus operate at a more elevated temperature than the low-pressure turbine blades. As such the operating conditions of the high-pressure turbine are very detrimental to the lifetime of the blade. The operating temperature in the high-pressure turbine can be higher than the melting point of the material that the blades are made from. Therefore, cooling within the blades is required to ensure that the blades do not melt. FIG. 4 shows a typical configuration of a prior art high-pressure turbine section, this is an enlarged image of components 16 and 17 in FIG. 1. In this, cooling air is brought from bleed sections within the compressor stages through the engine and into the turbine section to provide the cooling within the turbine blades; this cooling air enters the blade through an inlet in the root of the blade. A turbine stage comprises a number of turbine blades attached to the disc to form a bladed disc. Each bladed disc within the high-pressure turbine 41 section is coupled with a stator section 42. The stator sections comprise a number of vanes and are positioned between the turbine blade and the combustor 16. Arrow 43 represents the cooling airflow supplied form the compressor stage of the turbine engine.

Figure 5:
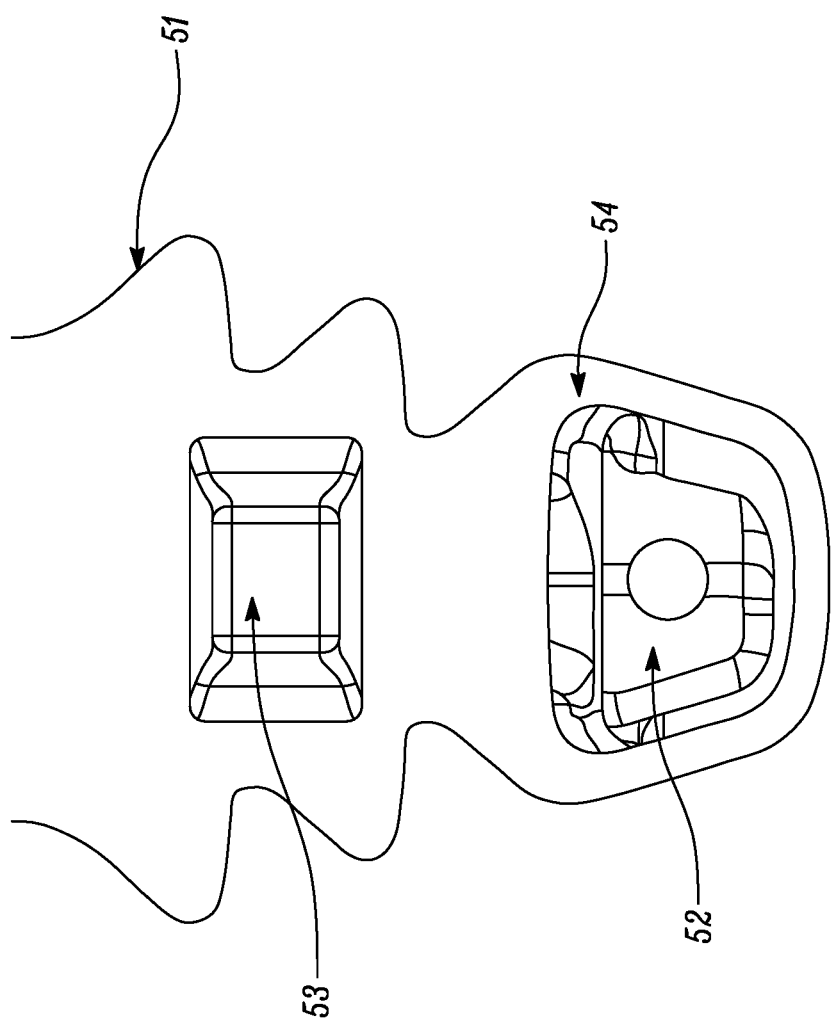
FIG. 5 is a prior art example of a turbine blade including the air intake.

FIG. 5 shows an example of a prior art root portion of a turbine blade. The blade is shown having the fir tree profile 51 which fits in the respective slot within the turbine disc. The root portion features an air inlet 52 in the base projection or bottom fir tree lobe 54 of the root. The root section of the blade is also having the anti-rotation pocket 53 for the cover plate to be located with the turbine blade.

Figure 6B:
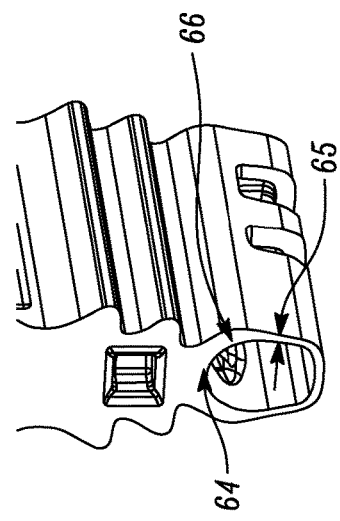
FIG. 6b is an enlarged 3d representation of the root of a turbine blade.
Figure 6D:
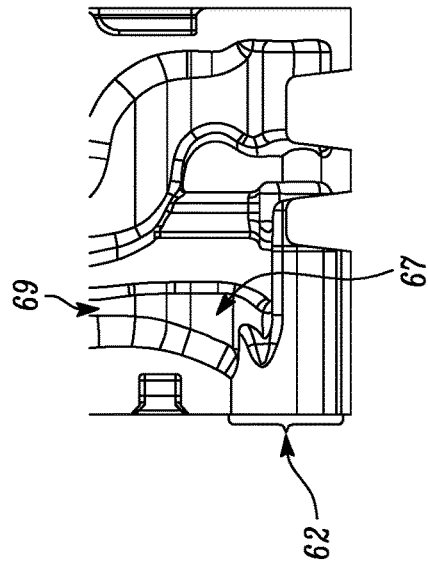
FIG. 6d is a side view of the base of the turbine blade according to the current disclosure.
Figure 6A:
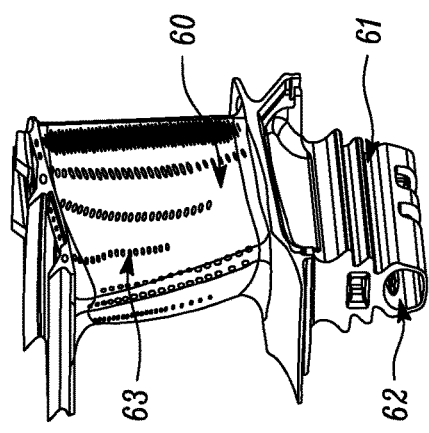
FIG. 6a is a 3d representation of a turbine blade according to the current disclosure.

FIG. 6*a* shows an example of a turbine blade of the present disclosure. Here the blade is shown having an aerofoil section 60 and a root section 61. The root section 61 is shown as being a fir tree, which is designed to fit within matching slot in the turbine disc. At the base of the root is the air inlet 62; this air inlet is supplied by a flow of cooling air that is brought into the engine to cool the blades. Part of the air that enters the inlet is diverted by an air inlet duct. This air inlet duct directs the separated air into a cooling network that passes through an internal passageway of the blade. The cooling air is then passed out of the blades through holes 63. The air exiting these blades allows for a cooling air film to be supplied around the surface of the blade.

FIG. 6*b* shows an enlarged image of the root of the turbine blade as shown in FIG. 6*a*. The air inlet has a series of design constraints that are crucial to the airflow and the structural strength of the blade. The air inlet has an inlet height 64 that is limited by the coverage of the sealing plate. There is also a limit on the amount of material that can be extracted to form the inlet; this is because if too much material is removed it can be detrimental to the strength of the blade. If too much material is removed there is a higher likelihood of failure in the blade during operation. As such the thickness of the wall 65 needs to be considered. A third consideration is the shape of the inlet. In this it has been found that if there is a constant radius 66 between the sidewall to the maximum height this minimises the stresses within the blade. By minimising the stresses within the blade, it can further reduce the chance of failure of the blade.

Figure 6C:
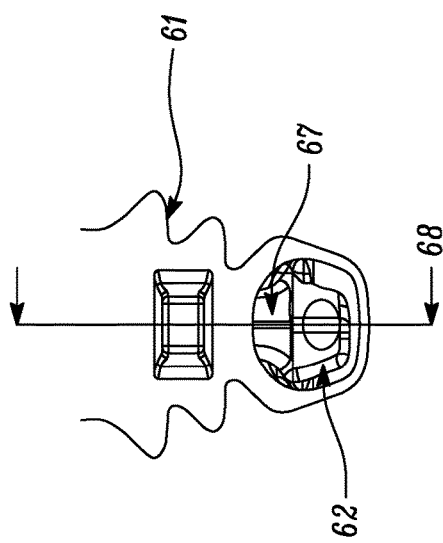
FIG. 6c is a front view of a the base of the turbine blade according to the current disclosure.

FIG. 6*c* shows a frontal image of the root end of the blade and the inlet. The figure shows the air inlet 62 following the curvature of the fir tree root 61. By following this shape, the area of the air inlet is increased; thus, allowing an increase in the amount of airflow through the blade. The increase in area has been performed whilst the stress levels have been managed at a level that is suitable for the blade. This also has the desired effect of increasing the amount of the inlet duct 67 that is visible from the opening; thus, increasing the airflow into the duct. The bigger the duct entry profile is, the more efficient the feed process of the cooling air is, which in turn allows more cooling holes to be fed on the blade's aerofoil etc. for a given feed pressure. FIG. 6*c* also shows that the root profile is symmetric about its centreline 68.

FIG. 6*d* shows a side profile of the turbine blade. The inlet 62 is shown leading into the duct 67. The difference in the area of the opening of the inlet between this and the prior art designs creates the equivalent of a step-in height. The effect of this stepped height difference is the greater exposure of the duct. By having greater exposure of the duct allows it to function as a scoop and channel some of the air entering the blade through the inlet into the leading-edge core passage. Thus, increasing the cooling of the blade. The figure also shows the leading-edge feed passage from the duct into the blade that has been modified. The maximum radial height of the inlet beyond the leading-edge passage has been limited to maintain the web 69 which is required to carry the fir tree loads.

Figure 7B:
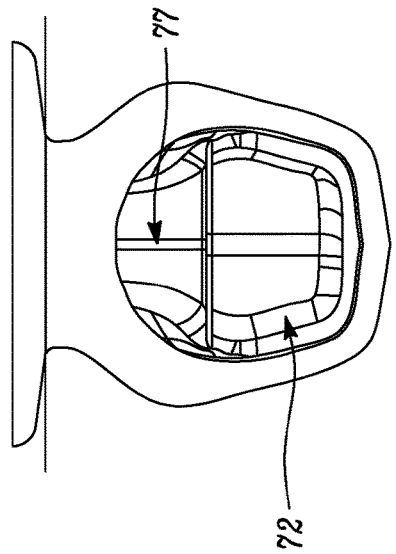
FIG. 7b presents an example of profile of the face area of an opening of the air inlet according to present disclosure.
Figure 7C:
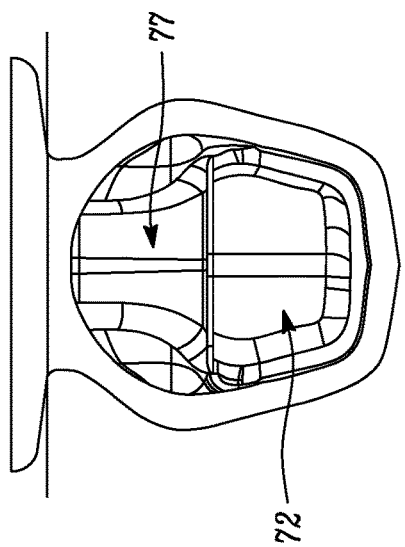
FIG. 7c presents an alternative example of the profile of the face area of an opening of the air inlet according to present disclosure.
Figure 7A:
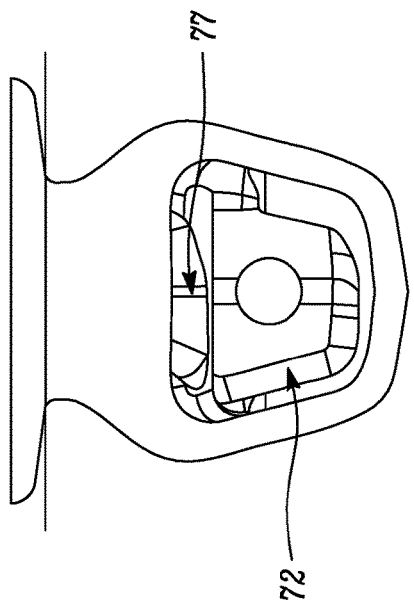
FIG. 7a presents an example of the profile of the face area of an opening in a prior art turbine blade.

FIG. 7 shows examples of the profile of different options for increasing the opening. FIG. 7*a* shows a current example of a blade design. In this the profile of the air inlet 72 occupies about 45% of the base projection of the fir tree which has been removed. In it is considered that the air inlet size provides sufficient airflow, whilst providing the requisite strength that is required in a high-pressure turbine blade. In the prior art it is also known to use keyhole shaped inlets to allow a greater amount of air to be supplied to the blade. It is thought that for such systems the strength is benefitted from having a greater amount of material in the walls that surround the inlet and that also the total amount of material that makes up the fir tree root of the blade. In the configuration presented in FIG. 7*a* there is about ~13% of the inlet duct 77 to the leading-edge passageway visible in line of sight through the inlet. However, in prior art turbine blades there is often no "inlet duct" at all. This is because the bottom of the blade is effectively cut off from where the web ends. A blade according to the present disclosure is presented in FIG. 7*b*. In this example ~58% of the base projection of the fir tree has been removed to form the air inlet 72. It has been found that by matching the shape of the inlet with the profile of the base projection of the fir tree that it is possible to still retain the strength in the blade. The strength of the area for such a configuration is 35% greater than for that of a blade having a keyhole opening. Managing stress in this area is critical as this is a high stress area within the blade and failure at this region would be critical. However, with the expanded opening the strength is maintained or increased over similar designs whilst allowing a greater airflow into the blade. In this configuration there is a ~32% of the inlet duct 77 to the leading-edge passageway visible in line of sight through the inlet. The effect of increasing the opening size also has the effect of changing the ratio of the split between the leading edge airflow and the multipass airflow. This configuration of increasing the height of the opening along with making the walls thinner allows for a greater amount of direct air into blade. However, by increasing the height of the opening can create problems with increased turbulence of airflow into the duct. This can result in a loss and can reduce the pressure of airflow within the leading-edge passageway. FIG. 7*c* shows an example of an air inlet 72 with a size close to maximum according to the present disclosure. In this the inlet occupies ~72% of the face of the base projection of the fir tree. It can be clearly seen here that the inlet follows the shape of the base projection. By doing this the inlet can remain within safe levels for strength and stress on the component. By increasing the inlet to cover such a large portion of the face of the bottom projection allows for greater volume of airflow into the blade. In this configuration there is a ~45% of the inlet duct 77 to the leading-edge passageway visible in line of sight through the inlet. Modelling has shown that in such a configuration there is a 1% increase in blade pressure. The increase in profile may be accompanied by a redesign of the duct entry. By tapering the duct entry, it can reduce the turbulence that has been created by increasing the inlet height and thus produce a smoother airflow into the leading-edge passage. The turbulence is as a result of the rotation of the blade relative to the entry airflow. As such the narrowing of the inlet allows for the turbulent airflow to be accommodated within the inlet. This angling of the inlet overcomes the loss associated with the height increase of the inlet. The presence of the taper on the front of the duct can result in an increase in the pressure in the leading-edge passageway. Although the configurations shown are in conjunction with an inlet duct, such a duct is not necessary and the air supplied into the opening may be directed in any suitable way that would be apparent to a person skilled in the art.

The inlets of the fir tree root can be formed by electro discharge machining. This allows for accurate control of the material removal process. The tool may be designed to have a small draft angle along a portion of it that is used near the inlet. This draft angle may be less than 2°. The draft angle may be 1.5°. The use of a draft angle accommodates alignment issues between the machine and the blade and ensures that the wall between the inlet and the edge of the fir tree is not too thin. If the wall is produced with too thin a profile it could result in a failure of the blade. It has been found that smoothly blending out the sides of the inlet when removing the material using EDM reduces the stresses in the fir tree root. Thus, by smoothing out the internal surface will improve the blade performance.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A blade for use in a gas turbine engine, the blade comprising a blade portion and a fir tree root portion,
    the blade portion and the fir tree root portion having a connected passage for allowing cooling air to flow within the blade, and
    the fir tree root portion having an air intake on its leading edge, the air intake allowing cooling air to enter the connected passage and wherein the fir tree root portion comprises a plurality of projections, including at least a base projection and a top projection; wherein
    the air intake is located in the base projection of the fir tree root portion and the air intake comprises an inlet that is at least 50% of a face of the base projection of the fir tree root portion,
    an upper portion of the air intake has a constant radius from opposing side walls to a maximum height of the air intake, and a lower portion of the air intake is shaped to match a profile of the base projection, and
    the air intake is tapered so that at points the air intake is narrower than the inlet.
2. The blade of claim 1, wherein the inlet is between 55% and 75% of the inlet of the base projection of the blade.
3. The blade as claimed in claim 1, wherein the inlet extends proximate to an antirotation pocket on the blade.
4. The blade as claimed in claim 1, wherein a duct is provided further into the blade than the inlet.
5. The blade as claimed in claim 4, wherein the duct has an opening that is 25-60% of the area of the inlet.
6. The blade as claimed in claim 5, wherein the duct has an opening that is equal to 30-50% of the area of the inlet.
7. The blade as claimed in claim 4, wherein the duct has a taper starting from a tip of the duct that guides air into the connected passage.
8. The blade as claimed in claim 1, wherein the blade is a turbine blade.
9. A gas turbine engine for an aircraft comprising:
    an engine core comprising a turbine, a compressor, and a core shaft connecting the turbine to the compressor;
    a fan upstream of the engine core, the fan comprising a plurality of fan blades; and
    a gearbox that receives an input from the core shaft and outputs drive to the fan so as to drive the fan at a lower rotational speed than the core shaft, wherein the turbine has a bladed disc comprising a plurality of turbine blades according to claim 1.
10. The gas turbine engine according to claim 9, wherein:
    the turbine is a first turbine, the compressor is a first compressor, and the core shaft is a first core shaft;
    the engine core further comprises a second turbine, a second compressor, and a second core shaft connecting the second turbine to the second compressor; and
    the second turbine, second compressor, and second core shaft are arranged to rotate at a higher rotational speed than the first core shaft.

\* \* \* \* \*